United States Patent
Langley (10) Patent No.: US 7,698,322 B1
(45) Date of Patent: Apr. 13, 2010

(54) METHOD AND SYSTEM FOR INTEGRATING DUPLICATE CHECKS WITH EXISTING COMPUTER SYSTEMS

(75) Inventor: Richard Jay Langley, Vienna, VA (US)

(73) Assignee: Daon Holdings Limited, George Town (KY)

( * ) Notice: Subject to any disclaimer, the term of this patent is extended or adjusted under 35 U.S.C. 154(b) by 0 days.

(21) Appl. No.: 12/558,666

(22) Filed: Sep. 14, 2009

(51) Int. Cl.
G06F 7/00 (2006.01)
G06F 21/00 (2006.01)
G05B 19/00 (2006.01)

(52) U.S. Cl. .................. 707/692; 713/186; 340/5.53
(58) Field of Classification Search .............. None
See application file for complete search history.

(56) References Cited

U.S. PATENT DOCUMENTS

| | | | |
|---|---|---|---|
| 5,224,173 | A | 6/1993 | Kuhns et al. |
| 5,412,727 | A | 5/1995 | Drexler et al. |
| 5,553,155 | A | 9/1996 | Kuhns et al. |
| 5,790,668 | A | 8/1998 | Tomko |
| 6,105,010 | A | 8/2000 | Musgrave |
| 6,783,459 | B2 | 8/2004 | Cumbers |
| 6,928,181 | B2 | 8/2005 | Brooks |
| 6,993,659 | B2 | 1/2006 | Milgramm et al. |
| 7,181,017 | B1 | 2/2007 | Nagel et al. |
| 7,272,721 | B1 | 9/2007 | Hellenthal |
| 7,310,042 | B2 | 12/2007 | Seifert |
| 7,318,050 | B1 | 1/2008 | Musgrave |
| 2003/0112120 | A1* | 6/2003 | K. ................... 340/5.53 |
| 2003/0154406 | A1* | 8/2003 | Honarvar et al. ........... 713/201 |
| 2004/0133582 | A1* | 7/2004 | Howard et al. ............. 707/100 |
| 2004/0158723 | A1* | 8/2004 | Root ..................... 713/186 |
| 2004/0167820 | A1* | 8/2004 | Melick et al. ............. 705/16 |
| 2004/0213437 | A1 | 10/2004 | Howard et al. |
| 2004/0236694 | A1 | 11/2004 | Tattan et al. |
| 2004/0258281 | A1 | 12/2004 | Delgrosso et al. |
| 2005/0225430 | A1* | 10/2005 | Seifert .................... 340/5.53 |
| 2006/0029261 | A1* | 2/2006 | Hoffman et al. ............ 382/115 |
| 2006/0075257 | A1 | 4/2006 | Martis et al. |
| 2006/0083408 | A1* | 4/2006 | Hoffman et al. ............ 382/115 |
| 2006/0101508 | A1 | 5/2006 | Taylor |
| 2006/0143471 | A1 | 6/2006 | Igarashi |
| 2006/0212407 | A1 | 9/2006 | Lyon |
| 2006/0239512 | A1 | 10/2006 | Petrillo |
| 2007/0011463 | A1 | 1/2007 | Garfinkle |
| 2007/0050638 | A1 | 3/2007 | Rasti |

(Continued)

FOREIGN PATENT DOCUMENTS

JP 2008-065572 3/2008

*Primary Examiner*—Neveen Abel Jalil
*Assistant Examiner*—Tarek Chbouki
(74) *Attorney, Agent, or Firm*—Kevin McDermott, Esq.

(57) ABSTRACT

A method for integrating duplicate checks with an existing computer system includes capturing participant biometric data from each of a plurality of participants and enrolling each of the participants in a biometric duplicate check computer system. Moreover, the method includes checking for potentially duplicate biometric enrollment data records and communicating potentially duplicate unique identifiers associated with potentially duplicate biometric enrollment data records from the biometric duplicate check computer system to the existing program computer system. Furthermore, the method includes identifying potentially duplicate enrollment data records using the potentially duplicate unique identifiers, determining whether any of the potentially duplicate enrollment data records are true duplicate enrollment data records, and deleting true duplicate data records that are not to be retained.

17 Claims, 4 Drawing Sheets

U.S. PATENT DOCUMENTS

| | | |
|---|---|---|
| 2007/0061590 A1 | 3/2007 | Boye et al. |
| 2007/0110283 A1 | 5/2007 | Hillhouse et al. |
| 2007/0195999 A1 | 8/2007 | Willis |
| 2007/0219801 A1 | 9/2007 | Sundaram et al. |
| 2007/0220274 A1 | 9/2007 | Jensen et al. |
| 2007/0260887 A1 | 11/2007 | Ito |
| 2007/0283167 A1* | 12/2007 | Venters et al. .............. 713/189 |
| 2007/0291996 A1* | 12/2007 | Hoffman et al. ............ 382/115 |
| 2008/0002861 A1 | 1/2008 | Yano et al. |
| 2008/0010464 A1 | 1/2008 | Hellenthal |
| 2008/0013801 A1* | 1/2008 | Reed et al. ................... 382/118 |
| 2008/0052527 A1* | 2/2008 | Siedlarz ...................... 713/186 |
| 2008/0092232 A1 | 4/2008 | Lu et al. |
| 2008/0201579 A1 | 8/2008 | Whillock |
| 2009/0174526 A1* | 7/2009 | Howard et al. ............. 340/5.52 |

* cited by examiner

METHOD AND SYSTEM FOR INTEGRATING DUPLICATE CHECKS WITH EXISTING COMPUTER SYSTEMS

BACKGROUND OF THE INVENTION

This invention relates generally to methods and systems for integrating computer systems, and more particularly, to methods and systems for simplifying integration of a duplicate check computer system with an existing computer system.

Public entitlement programs have been known to be managed by computer systems. Such entitlement programs include, but are not limited to, pension programs, welfare programs, and taxpayer registration programs. Duplicate program enrollments may be caused by various types of administrative errors made during enrollment or by identity fraud. Generally, identity fraud occurs when an entitlement program participant enrolls more than once in the same entitlement program using false identifications in order to receive benefits from multiple enrollments. Existing entitlement program computer systems are known to include detection means for identifying duplicate enrollments that are based on identifying features such as, but not limited to, name checks. However, these detection means are notoriously ineffective because they are easily circumvented by program participants perpetuating fraud on the entitlement program.

It has been known to integrate entitlement program computer systems with known computer systems including more robust detection means. Integrating such systems should facilitate saving money by reducing entitlement program costs. Thus, the costs associated with integrating such systems may be paid for with savings resulting from reductions in fraud. However, integrating known entitlement computer systems with known systems including more robust detection means is complex and requires a great deal of time. Consequently, it may take longer than desired for the system integration to pay for itself. As a result, costs associated with such system integrations have been known to discourage upgrading entitlement programs to include more robust detection means.

It appears that a simpler and quicker method of integrating an entitlement program computer system with a system including more robust detection means may substantially reduce integration costs while at the same time accelerate implementation time and thus shorten the time required for the integration to pay for itself.

BRIEF DESCRIPTION OF THE INVENTION

In one aspect, a method for integrating duplicate checks with an existing computer system is provided. The method includes assigning each of a plurality of participants a participant unique identifier, collecting demographic data from each of the plurality of participants, associating each of the plurality of participant unique identifiers with demographic data collected from a respective one of the plurality of participants, and storing each of the plurality of participant unique identifiers and associated demographic data in the existing program computer system as enrollment data records. The method also includes capturing participant biometric data from each of the plurality of participants. Moreover, the method includes enrolling each of the plurality of participants in a biometric duplicate check computer system by obtaining each of the plurality of participant unique identifiers from the existing computer system, inputting each of the plurality of participant unique identifiers into the biometric duplicate check computer system, associating each of the plurality of participant unique identifiers with participant biometric data captured from a corresponding one of the plurality of participants, and storing each of the plurality of participant unique identifiers and associated participant biometric data as a biometric enrollment data record in the biometric duplicate check computer system.

The method also includes checking for potentially duplicate biometric enrollment data records stored in the biometric duplicate check computer system by comparing one of the biometric enrollment data records against the biometric enrollment data records stored in the biometric duplicate check computer system, after enrolling each of the participants in the biometric duplicate check computer system. Potentially duplicate biometric enrollment data records are determined to exist when the participant biometric data included in a plurality of biometric enrollment data records, stored in the biometric duplicate check computer system, matches the participant biometric data included in the one biometric enrollment data record. The method then communicates potentially duplicate participant unique identifiers associated with the potentially duplicate biometric enrollment data records from the biometric duplicate check computer system to the existing program computer system, associates each of the potentially duplicate unique identifiers with a corresponding enrollment data record, and identifies each of the corresponding enrollment data records as a potentially duplicate enrollment data record. Next, the method determines whether any of the potentially duplicate enrollment data records is a true duplicate enrollment data record using existing processes included in the existing computer system. The method then includes determining one of the true duplicate enrollment data records to retain, updating information in the retained true duplicate enrollment data record, and deleting true duplicate enrollment data records that are not to be retained, using the existing processes included in the existing computer system, when a plurality of the potentially duplicate enrollment data records are true duplicate enrollment data records.

In another aspect a system for integrating biometric duplicate checks in an entitlement program is provided. The system includes an existing computer system configured to store enrollment data records of a plurality of participants in the entitlement program. Each enrollment data record includes a unique identifier and associated demographic data corresponding to an entitlement program participant. The system also includes a biometric duplicate check computer system configured to obtain the unique identifier of each entitlement program participant from the existing computer system, input the unique identifier of each entitlement program participant in the biometric duplicate check computer system, capture participant biometric data from each entitlement program participant, associate the unique identifier of each entitlement program participant with captured participant biometric data of the corresponding entitlement program participant, and store the unique identifiers and associated participant biometric data therein as biometric enrollment data records. The biometric duplicate check computer system is also configured to compare one of the biometric enrollment data records against the biometric enrollment data records stored in the biometric duplicate check computer system to check for potentially duplicate biometric enrollment data records. Moreover, the biometric duplicate check computer system determines that potentially duplicate biometric enrollment data records exist when the participant biometric data included in a plurality of biometric enrollment data records, stored in the biometric duplicate check computer system, matches the participant biometric data included in the one biometric enrollment data record. The biometric duplicate check computer system also positions potentially duplicate unique identifiers associated with potentially duplicate biometric enrollment data records in a duplicate check results queue.

It should be appreciated that the existing program computer system is configured to automatically obtain the potentially duplicate unique identifiers from the duplicate check results queue, associate each of the potentially duplicate unique identifiers with a corresponding enrollment data record, and identify each of the corresponding enrollment data records as a potentially duplicate enrollment data record. Moreover, the existing program computer system is configured to determine whether each of the potentially duplicate enrollment data records is a true duplicate enrollment data record, to determine one of the true duplicate enrollment data records to retain, to update information in the retained true duplicate enrollment data record, and to delete true duplicate enrollment data records that are not to be retained, using existing processes included in the existing program computer system when a plurality of the potentially duplicate enrollment data records are true enrollment data records.

In yet another aspect, a method of synchronizing biometric enrollment data records stored in a biometric duplicate check computer system with enrollment data records stored in an existing computer system is provided. The method includes inputting a participant unique identifier associated with a participant enrolling in the biometric duplicate check computer system, capturing participant identity data from the enrolling participant, associating the participant unique identifier with the participant identity data, and storing the participant unique identifier and participant identity data in the duplicate check computer system as one of a plurality of identity enrollment data records. Moreover, the method includes comparing the one identity enrollment data record against identity enrollment data records stored in the duplicate check computer system, to check for potentially duplicate identity enrollment data records, after storing the participant unique identifier and participant identity data in the duplicate check computer system. The method also includes determining that potentially duplicate identity enrollment data records exist when the participant identity data included in a plurality of identity enrollment data records, stored in the duplicate check computer system, matches the participant identity data included in the one identity enrollment data record. After determining that potentially duplicate identity enrollment data records exist, the method includes positioning potentially duplicate unique identifiers associated with potentially duplicate identity enrollment data records in a duplicate check results queue.

Furthermore, the method includes obtaining, automatically, the potentially duplicate unique identifiers from the duplicate check results queue with the existing program computer system, associating each of the potentially duplicate unique identifiers with a corresponding enrollment data record with the existing program computer system, and identifying each of the corresponding enrollment data records as a potentially duplicate enrollment data record. After identifying the potentially duplicate enrollment data records, the method includes determining whether any of the potentially duplicate enrollment data records is a true duplicate enrollment data record. Next, the method includes determining one of the true duplicate enrollment data records to retain, updating information in the retained true duplicate enrollment data record, and deleting true duplicate enrollment data records that are not to be retained, using existing processes included in the existing program computer system when a plurality of the potentially duplicate enrollment data records are true duplicate enrollment data records. The method then includes transmitting a delete command, including the unique identifiers of the deleted true duplicate enrollment data records, to the duplicate check computer system, and deleting identity enrollment data records stored in the duplicate check computer system that are associated with the unique identifiers of the deleted true duplicate enrollment data records.

DETAILED DESCRIPTION OF THE INVENTION

Figure 1:
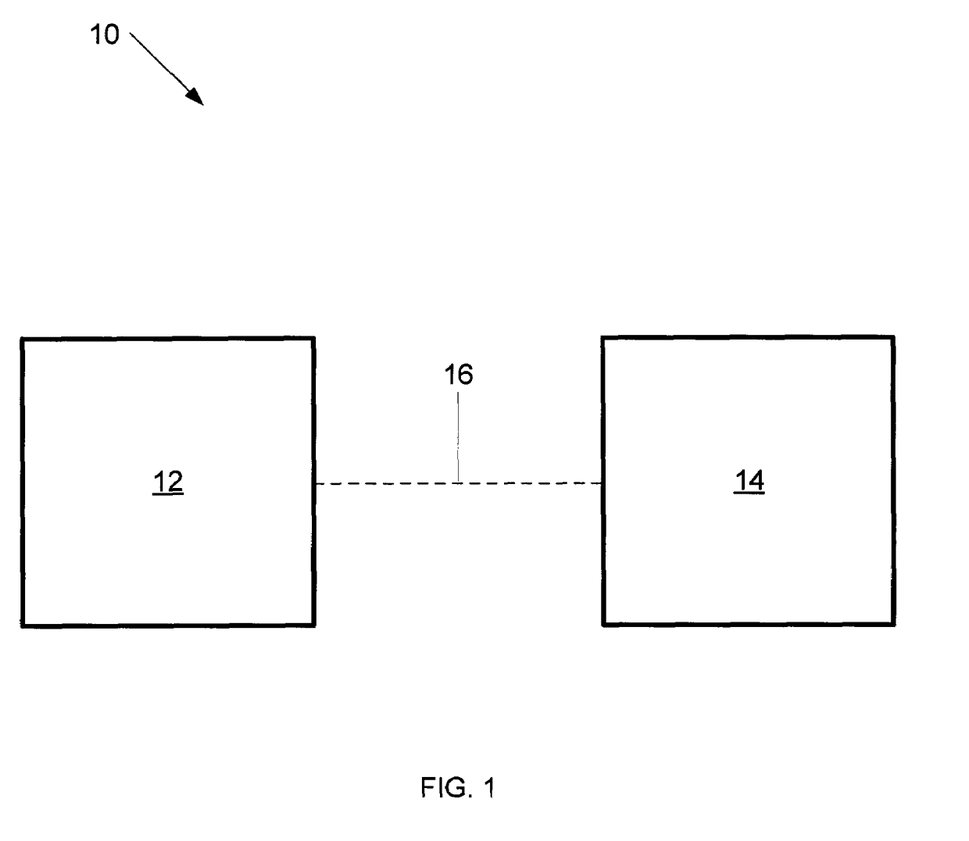
FIG. 1 is a simplified block diagram of an exemplary embodiment of a Retrofitted Entitlement Program Computer (REPC) System including a simple and easily integrated system interface.

FIG. 1 is a simplified block diagram of an exemplary embodiment of a Retrofitted Entitlement Program Computer (REPC) System 10. More specifically, REPC system 10 includes an Existing Program Computer (EPC) System 12, a Biometric Duplicate Check Computer (BDCC) System 14, and a system interface 16. It should be appreciated that the system interface 16 operatively couples EPC system 12 and BDCC system 14 such that information is exchanged between EPC system 12 and BDCC system 14.

In the exemplary embodiment, the EPC system 12 may be any computer system involved with enrolling participants in programs that would benefit from improved detection of potentially duplicate participant enrollments. Such programs include programs administered by national governments such as, but not limited to, pension programs, welfare programs and taxpayer registration programs. Moreover, the EPC system 12 may be used to manage and administer a plurality of such programs.

The BDCC system 14 is a computer system that is configured to facilitate reliably detecting true duplicate enrollment data records stored in the EPC system 12. In the exemplary embodiment, the BDCC system 14 uses biometrics as the basis for detecting and reliably determining potentially duplicate biometric enrollment data records in the BDCC system 14. However, it should be appreciated that in other embodiments, the BDCC system 14 may use anything as the basis for detection that facilitates reliably determining potentially duplicate biometric enrollment data records as described herein.

By operatively coupling the EPC system 12 to the BDCC system 14 via the system interface 16 to create the REPC system 10, biometric duplicate checking may be added to the EPC system 12 such that the EPC system 12 is able to effectively detect potentially duplicate enrollment data records stored therein without being modified, via a simple and quickly implemented system integration. Moreover, a method of simply and quickly integrating the EPC system 12 with the BDCC system 14 as described herein requires less time than that required for known integration techniques of known identity detection systems. Consequently, business benefits resulting from better detection of potentially duplicate enrollment data records begin much sooner than with known integration techniques of known identity detection systems.

Figure 2:
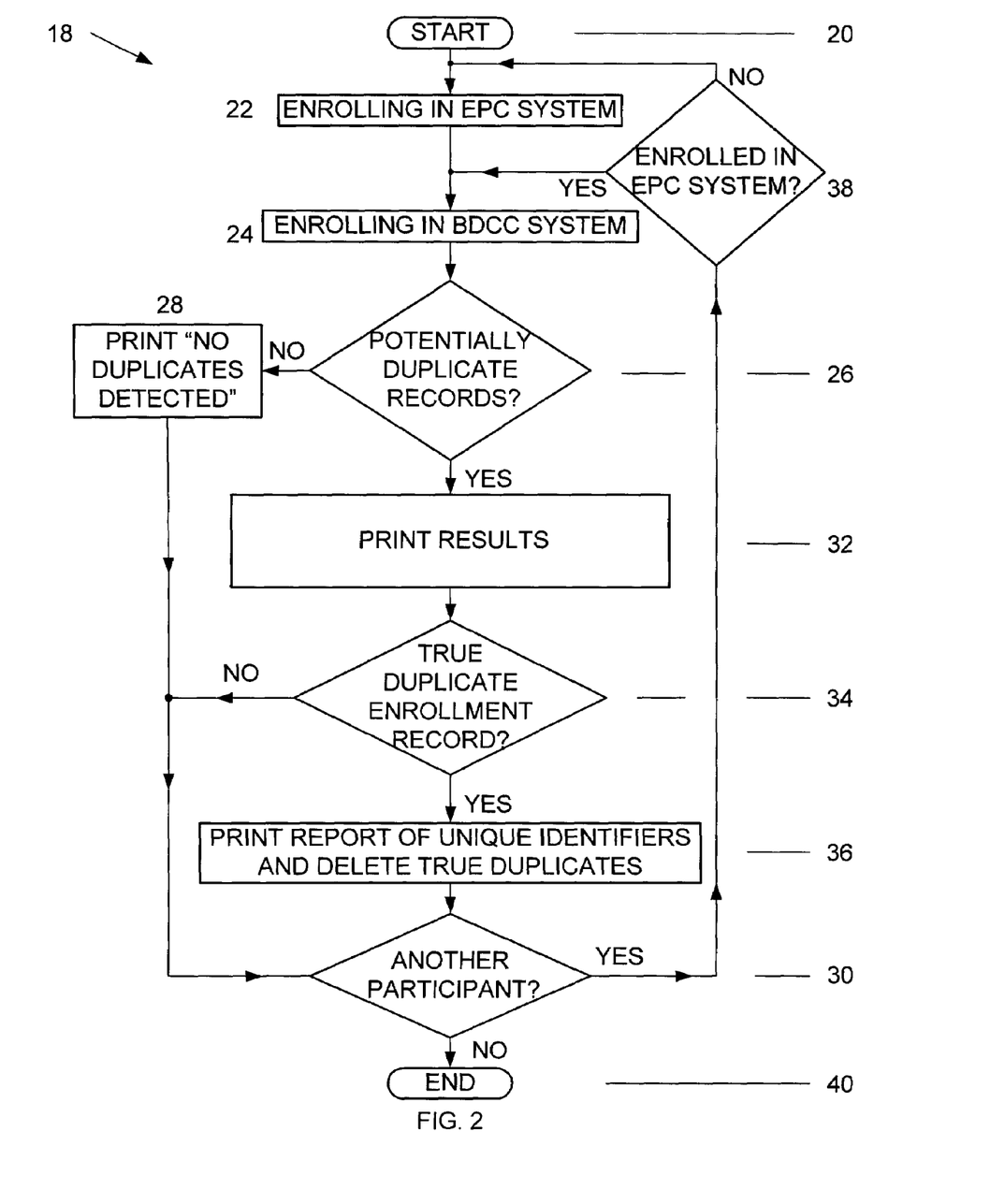
FIG. 2 is a flowchart illustrating an exemplary method of integrating computer systems over the system interface shown in FIG. 1.

FIG. 2 is a flowchart 18 illustrating an exemplary method for simply and quickly integrating the EPC system 12 with the BDCC system 14 via the system interface 16. It should be appreciated that in the exemplary embodiment, the system interface 16 is implemented manually and does not constitute a communications medium that is used for transmitting messages between the EPC system 12 and the BDCC system 14.

The method starts 20 by enrolling 22 program participants into at least one program managed by the EPC system 12. In the exemplary embodiment, enrolling 22 program participants starts by assigning a unique identifier that is a unique series of alphanumeric characters to each program participant and storing the assigned unique identifiers in the EPC system 12. It should be appreciated that in other embodiments the unique identifier may be any type of identifier that facilitates uniquely identifying program participants as described herein, such as a unique identity number. Enrolling 22 program participants also includes collecting demographic data of each enrolling program participant and storing the collected demographic data in the EPC system 12, such that the collected demographic data of each enrolling program participant is associated with the unique identifier assigned to the respective enrolling program participant. Demographic data as used herein includes, but is not limited to, biographic data of the enrolling program participant and other data required by the at least one program managed by the EPC system 12. Thus, demographic data may include, but is not limited to, participant name, age, date of birth, address, citizenship and marital status.

It should be understood that enrollment data of each program participant constitutes both the unique identifier and the collected demographic data of the program participant. Thus, by virtue of assigning a unique identifier to and collecting demographic data from enrolling program participants, associating each unique identifier with respective program participant demographic data, and storing the unique identifiers and demographic data on the EPC system 12 as enrollment data records, program participants are enrolled in the at least one program managed by the EPC system 12. Thus, the EPC system 12 as described herein at least initially enrolls program participants in programs and stores and maintains the enrollment data records. It should be appreciated that the EPC system 12 is also configured to use the unique identifiers as primary keys for respective enrollment data records.

As the number of participants enrolled in the EPC system 12 increases, the potential for creating duplicate enrollment data records increases. Duplicate enrollment data records may be created by accidental administrative errors, such as but not limited to typographical errors, made while enrolling 22 program participants, or by individuals deliberately attempting to perpetuate identity fraud upon the at least one program managed by the EPC system 12. Consequently, the EPC system 12 includes existing business processes, services and tools for at least detecting potentially duplicate enrollment data records, determining whether or not such potentially duplicate enrollment data records are true duplicate enrollment data records, resolving which one of the true duplicate enrollment data records to retain in the EPC system 12, and resolving which ones of the true duplicate enrollment data records to delete from the EPC system 12. Such existing business processes, services and tools may be implemented in any manner that facilitates at least detecting, determining and resolving potentially duplicate enrollment data records, such as, but not limited to, manually and automatically. It should be appreciated that the existing business processes, services and tools enable the EPC system 12 to at least determine true duplicate enrollment data records, delete enrollment data records, merge enrollment data records, add enrollment data records, and update enrollment data records. Moreover, it should be appreciated that the existing business processes, services and tools may be implemented internally by the EPC system 12, or by an external system operatively coupled to the EPC system 12.

Upon detecting potentially duplicate enrollment data records, the EPC system 12 uses an appropriate one of the existing business processes, services or tools to determine which of the potentially duplicate enrollment data records are true duplicate enrollment data records, to determine which of the true duplicate enrollment data records to retain, to update information in the true duplicate enrollment data record to be retained, and to delete true duplicate enrollment data records not being retained. Existing systems such as the EPC system 12 may generally use known methods such as, but not limited to, name checking to detect potentially duplicate enrollment data records. However, because name checking and such other known methods are ineffective in detecting potentially duplicate enrollment data records stored in the EPC system 12, the EPC system 12 is effectively unable to detect potentially duplicate enrollment data records stored therein and thus is effectively unable to facilitate preventing related identity fraud.

After enrolling 22 in the EPC system 12, enrolling program participants also enroll 24 in the BDCC system 14. Enrolling 24 in the BDCC system 14 begins by determining at least one biometric feature desired to be used as the basis for determining potentially duplicate biometric enrollment data records in the BDCC system 14. Each enrolling program participant reports to one of a plurality of enrollment stations such that biometric data corresponding to the at least one desired feature may be captured from each of the enrolling program participants by a biometric capture device. In order to properly capture and collect the biometric enrollment data, the BDCC system 14 is configured such that enrollment screens appropriate for collecting the biometric enrollment data are included in enrollment workstations. In the exemplary embodiment, a fingerprint is used as the at least one biometric feature. Although a fingerprint is described as the at least one desired biometric feature in the exemplary embodiment, it should be appreciated that in other embodiments any biometric feature, or any combination of the same or different biometric features, may be used that facilitates enabling the BDCC system 14 to detect potentially duplicate biometric enrollment data records stored in the BDCC system 14.

Next, the unique identifier of each enrolling program participant is obtained from the EPC system 12 and is input into the BDCC system 14 at one of the enrollment workstations. The captured biometric data and the corresponding unique identifier of each enrolling program participant are both stored in the BDCC system 14, such that the captured biometric data and the corresponding unique identifier of each enrolling program participant are associated with each other. It should be understood that the captured biometric data and the corresponding unique identifier of each enrolling program participant are stored in the BDCC system 14 as a new biometric enrollment data record. Moreover, it should be understood that a plurality of biometric enrollment data records, that each correspond to a program participant, are stored in the BDCC system 14. Furthermore, it should be understood that each of the plurality of biometric enrollment data records stored in the BDCC system 14 includes the captured biometric data associated with the unique identifier of a corresponding program participant, and may include demographic data of the corresponding program participant. In the exemplary embodiment, demographic data of the enrolling program participant is manually input into a keyboard at the enrollment workstation. The demographic data of the enrolling program participant is stored in the BDCC system 14 such that the demographic data of the enrolling program participant is associated with the unique identifier of the enrolling program participant in the BDCC system 14, and is also included in the new biometric enrollment data record. It should be understood that each biometric enrollment data record stored in the BDCC system 14 is logically linked to a corresponding enrollment data record stored in the EPC system 12 by the unique identifiers of respective enrolling program participants.

In the exemplary embodiment enrolling program participants initially enroll 22 in the EPC system 12, then enroll 24 in the BDCC system 14 by creating a new biometric enrollment data record at the enrollment station, such that both the enrollment data record in the EPC system 12 and the new biometric enrollment data record in the BDCC system 14 are effectively created simultaneously. However, it should be appreciated that in other embodiments program participants are not required to enroll in the BDCC system 14 such that the enrollment data record in the EPC system 12 and the new biometric enrollment data record in the BDCC system 14 are effectively created simultaneously. That is, in other embodiments any period of time may elapse between enrolling in the EPC system 12 and the BDCC system 14, such that the system interface 16 between the EPC system 12 and the BDCC system 14 may be easily and quickly implemented as described herein. However, regardless of the elapsed time between enrolling in the EPC system 12 and the BDCC system 14, it should be understood that program participants are required to enroll in the EPC system 12 before enrolling in the BDCC system 14 such that the BDCC system 14 is able to successfully obtain unique identifiers of enrolling program participants from the EPC system 12.

It should be understood that in the exemplary embodiment the BDCC system 14 is also configured to use each unique identifier as a primary key for each respective new biometric enrollment data record. Consequently, because the EPC system 12 and the BDCC system 14 both use the same unique identifiers as primary keys for their respective data records, the unique identifiers constitute the system interface 16 between the enrollment data records stored in the EPC system 12 and corresponding biometric enrollment data records stored in the BDCC system 14. That is, each unique identifier functions to logically link an enrollment data record of a respective program participant stored in the EPC system 12 with a biometric enrollment data record of the same respective program participant stored in the BDCC system 14. It should be appreciated that the system interface 16 is considered to be manually implemented in the exemplary embodiment because the unique identifiers are manually input into the keyboard at the enrollment workstation and at the EPC system 12.

After a participant is enrolled in both the EPC system 12 and the BDCC system 14, the BDCC system 14 automatically checks 26 to determine whether or not potentially duplicate biometric enrollment data records exist therein. Specifically, in order to properly check 26 for potentially duplicate biometric enrollment data records, the BDCC system 14 compares a new biometric enrollment data record against all biometric enrollment data records stored in the BDCC system 14, including the new biometric enrollment data record. A biometric enrollment data record is identified as a potentially duplicate biometric enrollment data record when biometric data included in the biometric enrollment data record matches the biometric data included in the new biometric enrollment data record. Thus, it should be understood that when the comparison identifies a plurality of potentially duplicate biometric enrollment data records, one of the identified plurality of potentially duplicate biometric enrollment data records is necessarily the new biometric enrollment data record, and the other identified potentially duplicate biometric enrollment data records are not the new biometric enrollment data record. Consequently, by virtue of identifying a plurality of potentially duplicate biometric enrollment data records, potentially duplicate biometric enrollment data records are determined to exist in the BDCC system 14. Accordingly, it should be understood that when the comparison identifies a single potentially duplicate biometric enrollment data record, the single potentially duplicate biometric enrollment data record is necessarily the new biometric enrollment data record. Thus, by virtue of identifying a single potentially duplicate biometric enrollment data record, it is determined that potentially duplicate enrollment data records do not exist in the BDCC system 14.

When the check 26 determines that potentially duplicate enrollment data records do not exist in the BDCC system 14, the BDCC system 14 prints a hardcopy report 28 including a message that reads "no duplicates detected" and processing continues by determining whether another program participant is to enroll 30 in the BDCC system 14. Although the message reads "no duplicates detected" in the exemplary embodiment, it should be appreciated that in other embodiments any message indicating that potentially duplicate biometric enrollment data records have not been detected may be printed in the hardcopy report 28.

Otherwise, when the check 26 determines that potentially duplicate biometric enrollment data records exist in the BDCC system 14, the BDCC system 14 communicates results of the potentially duplicate biometric enrollment data record check 26 to the EPC system 12. Specifically, the BDCC system 14 prints 32 the unique identifiers associated with respective ones of the plurality of potentially duplicate biometric enrollment data records in a hardcopy report, as the results of the potentially duplicate biometric enrollment data record check 26. In the exemplary embodiment a message is also printed in the hardcopy report that reads "potential duplicates detected." It should be appreciated that in other embodiments any message indicating that potentially duplicate biometric enrollment data records have been detected may be printed in the hardcopy report.

It should be understood that by virtue of the correspondence between the biometric enrollment data records stored in the BDCC system 14 and the enrollment data records stored in the EPC system 12, that potentially duplicate biometric enrollment data records in the BDCC system 14 correspond to potentially duplicate enrollment data records in the EPC system 12. Moreover, it should be understood that the business processes, services and tools existing in the EPC system 12 are configured to resolve enrollment data records stored in the EPC system 12 identified as potentially duplicate enrollment data records.

Next, BDCC system personnel provide the printed hardcopy report to an operator of the EPC system 12. The operator of the EPC system 12 manually inputs the unique identifiers listed in the hardcopy report into the EPC system 12 such that the EPC system 12 associates each of the unique identifiers listed in the hardcopy report with a corresponding enrollment data record stored therein. By virtue of associating a listed unique identifier with a corresponding enrollment data record, the corresponding enrollment data record is identified as a potentially duplicate enrollment data record that corresponds to a potentially duplicate biometric enrollment data record. Moreover, the EPC system 12 determines 34 whether or not any of the potentially duplicate enrollment data records stored therein is a true duplicate enrollment data record. When the EPC system 12 determines 34 that potentially duplicate enrollment data records stored therein are not true duplicate enrollment data records, processing continues by determining whether another program participant is to enroll 30 in the BDCC system 14.

Otherwise, when the EPC system 12 determines 34 that a plurality of potentially duplicate enrollment data records stored therein are true duplicate enrollment data records, the EPC system 12 executes an appropriate one of the existing business processes, services or tools to determine one of the true duplicate enrollment data records to retain. Moreover, the EPC system 12 executes an appropriate one of the existing business processes, services or tools to, if necessary, update information in the true duplicate enrollment data record to be retained, and then deletes the other true duplicate enrollment data records that are not to be retained. It should be appreciated that in other embodiments, any business process may be used to detect and resolve potentially duplicate enrollment data records that facilitates simplifying integration of the EPC system 12 and the BDCC system 14 as described herein. Although unique identifiers provided by the BDCC system 14 are used by the EPC system 12 to facilitate determining true duplicate enrollment data records in the exemplary embodiment, it should be appreciated that in other embodiments the existing business processes, services and tools included in the EPC system 12 may utilize the unique identifiers as well as any additional data stored in the BDCC system 14 that facilitates the EPC system 12 to determine true duplicate enrollment data records as described herein. Moreover, it should be appreciated that in the exemplary embodiment the EPC system 12 is able to utilize the unique identifiers and additional data from the BDCC system 14 to determine true duplicate enrollment data records stored in the EPC system 12 without being modified.

After updating the enrollment data records stored in the EPC system 12, the EPC system 12 communicates the unique identifiers of the deleted true duplicate enrollment data records to the BDCC system 14. Specifically, the EPC system 12 prints 36 a hardcopy report listing the unique identifiers of the deleted true duplicate enrollment data records, and the operator of the EPC system 12 provides the hardcopy report to the operator of the BDCC system 14. The BDCC system operator then manually inputs the unique identifiers listed in the hardcopy report into the BDCC system 14, such that the BDCC system 14 is able to delete biometric enrollment data records from the BDCC system 14 associated with the unique identifiers listed in the hardcopy report. It should be appreciated that by virtue of deleting biometric enrollment data records associated with the listed unique identifiers, the BDCC system 14 deletes 36 true duplicate biometric enrollment data records from the BDCC system 14 that correspond to the true duplicate enrollment data records deleted from the EPC system 12. Thus, synchronization between the biometric enrollment data records stored in the BDCC system 14 and the enrollment data records stored in the EPC system 12 is facilitated to be enhanced.

After deleting 36 the true duplicate biometric enrollment data records from the BDCC system 14, if another program participant is to enroll 30 in the BDCC system 14 the method continues by determining 38 whether or not the program participant is enrolled in the EPC system 12. When the program participant is not enrolled in the EPC system 12, the program participant enrolls 22 in the EPC system 12. Otherwise, the program participant enrolls 24 in the BDCC system 14. However, if another program participant is not to enroll 30, the method ends 40.

It should be understood that requiring enrollment in the at least one program managed by the EPC system 12 before enrolling new biometric enrollment data records in the BDCC system 14, and requiring storage of the new corresponding biometric enrollment data records in the BDCC system 14 prior to checking for potentially duplicate biometric enrollment data records, facilitates simply maintaining synchronization between the enrollment data records stored in the EPC system 12 and the biometric enrollment data records stored in the BDCC system 14 with minimal integration effort. Moreover, it should be appreciated that storing the new biometric enrollment data records before checking for potentially duplicate biometric enrollment data records greatly reduces the number and types of communications required between the EPC system 12 and the BDCC system 14 via the system interface 16.

As an example of operations 26, 32, 34 and 36 described in the exemplary embodiment, the BDCC system 14 may determine that unique identifiers 3A, 4A and 5A are associated with potentially duplicate biometric enrollment data records. Thus, the BDCC system 14 prints the unique identifiers in a hardcopy report such that the hardcopy report may be provided to the operator of the EPC system 12. The operator of the EPC system 12 enters the unique identifiers 3A, 4A, 5A, listed in the hardcopy report, into the EPC system 12 such that the EPC system 12 is able to determine that the enrollment data records associated with the unique identifiers 3A and 4A are true duplicate enrollment data records, but that the enrollment data record associated with unique identifier 5A is not a true duplicate enrollment data record. The EPC system 12 then determines to retain the unique identifier 3A and the enrollment data record associated with the unique identifier 3A, and, if necessary, updates the enrollment data record associated with the unique identifier 3A. The true duplicate enrollment data record associated with the unique identifier 4A is then deleted from the EPC system 12.

After deleting the true duplicate enrollment data record associated with identity number 4A, the EPC system 12 prints a hardcopy report indicating that the unique identifier 4A is associated with a true duplicate enrollment data record. The operator of the EPC system 12 provides the hardcopy report to the operator of the BDCC system 14. The BDCC system operator enters the unique identifier 4A into the BDCC system 14 such that the BDCC system 14 deletes the biometric enrollment data record associated with the unique identifier 4A. Thus, by virtue of deleting the biometric enrollment data record associated with the unique identifier 4A, the BDCC system 14 deletes a true duplicate biometric enrollment data record from the BDCC system 14 corresponding to the true duplicate enrollment data record deleted from the EPC system 12. Thus, synchronization between the biometric enrollment data records stored in the BDCC system 14 and the enrollment data records stored in the EPC system 12 is facilitated to be enhanced.

Although the system interface 16 is implemented manually in the exemplary embodiment, it should be appreciated that in other embodiments the system interface 16 may be implemented in any manner that facilitates simply and quickly integrating the EPC system 12 with the BDCC system 14. For example, the system interface 16 may be implemented automatically by assigning a different bar code for each unique identifier of each enrolling program participant, such that enrolling program participants use the bar code to automatically enter the unique identifiers into the BDCC system 14. Using a bar code to enter the unique identifier may facilitate reducing typographical errors that may occur when entering unique identifiers, and may facilitate reducing creation of duplicate enrollment data records due to typographical errors.

Figure 3:
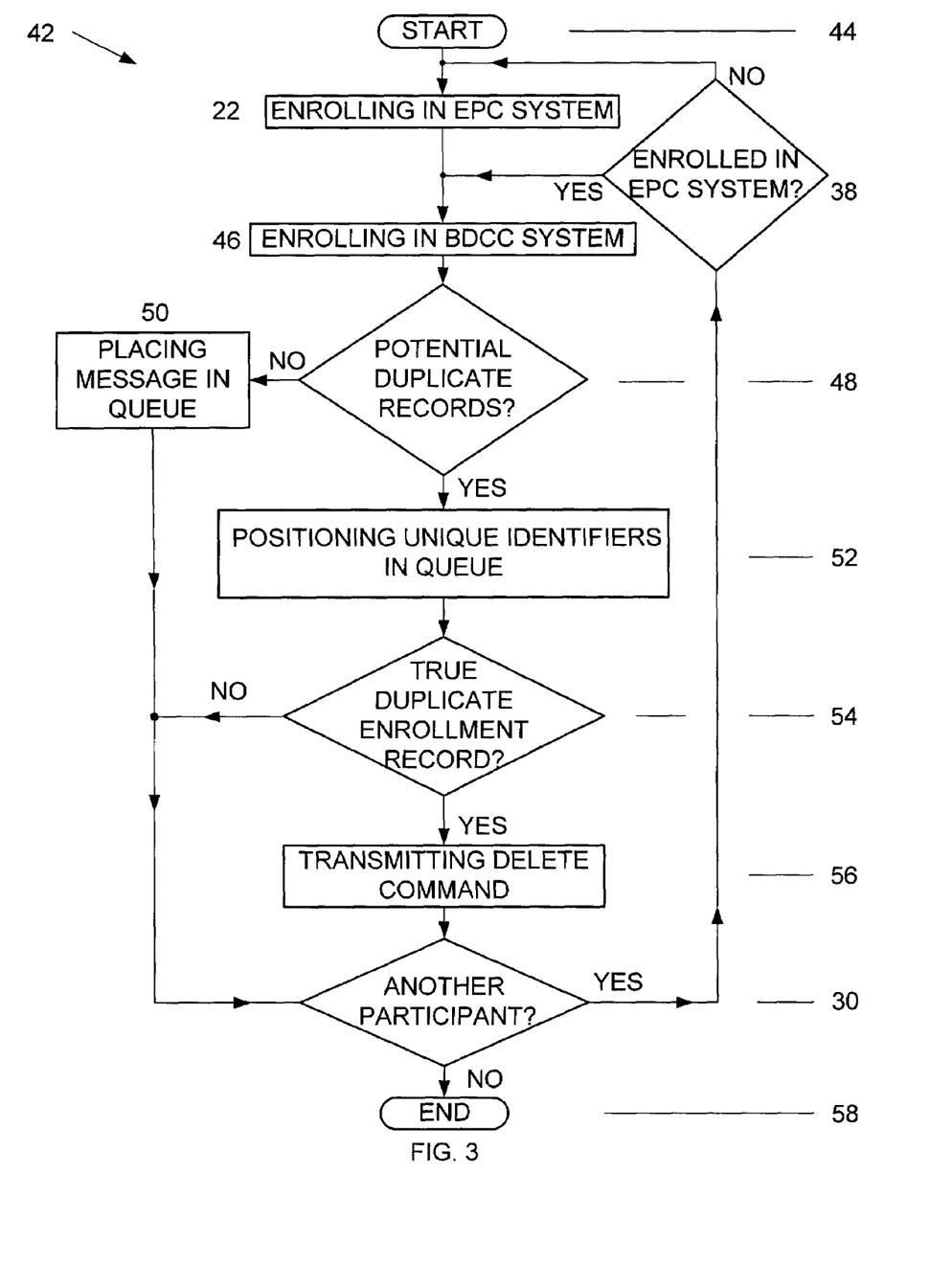
FIG. 3 is a flowchart illustrating another exemplary method of integrating computer systems over the system interface shown in FIG. 1.

The information shown in FIG. 3 is substantially the same information shown in FIG. 2, but implements the system interface 16 automatically instead of manually. As such, information illustrated in FIG. 3 and described herein with regard to FIG. 3, that is substantially identical to information shown in FIG. 2, is not included in the description of the alternative exemplary method detailed below.

FIG. 3 is flowchart 42 illustrating an alternative exemplary method for simply, quickly, and automatically integrating the EPC system 12 with the BDCC system 14 via the system interface 16. It should be understood that in this alternative exemplary embodiment, the EPC system 12 and the BDCC system 14 are communicatively and operatively coupled together by a communications medium in the form of the system interface 16. More specifically, in this alternative embodiment, the interface system 16 constitutes a communications network that is used for transmitting messages between the EPC system 12 and the BDCC system 14.

The method starts 44 by enrolling 22 program participants into at least one program managed by the EPC system 12. After enrolling 22 the program participant into the at least one program managed by the EPC system 12, the EPC system 12 automatically initiates enrolling 46 the enrolling program participant in the BDCC system 14 by prompting the BDCC system 14 to automatically obtain enrollment data records of the enrolling program participant from the EPC system 12. In response, the BDCC system 14 obtains the unique identifier of the enrolling program participant from the EPC system 12. The BDCC system 14 also obtains the demographic data of the enrolling program participant, associated with the unique identifier of the enrolling program participant stored in the EPC system 12, and associates the demographic data of the enrolling program participant with the obtained unique identifier in the BDCC system 14. It should be understood that each enrolling program participant is required to enroll in the EPC system 12 before enrolling in the BDCC system 14. Although this alternative embodiment is described as obtaining demographic data of program participants, it should be appreciated that in other embodiments demographic data of the program participants may not be obtained. It should be appreciated that by automatically entering the unique identifiers into the BDCC system 14, typographical errors made by enrolling program participants are facilitated to be reduced. Moreover, it should be appreciated that duplicate enrollment data records created as a result of such typographical errors are also facilitated to be reduced.

The BDCC system 14 also captures the desired biometric data from the enrolling program participant and stores the captured biometric data, and the corresponding unique identifier and associated demographic data, in the BDCC system 14 such that the captured biometric data, and the corresponding unique identifier and associated demographic data are associated with each other. It should be understood that the captured biometric data, and corresponding unique identifier and associated demographic data are stored in the BDCC system 14 as a biometric enrollment data record. It should be appreciated that because the captured biometric data facilitates identifying individuals, the captured biometric data may also be known as identity data, and the biometric enrollment data record may be known as an identity enrollment data record.

Next, the BDCC system 14 automatically checks 48 to determine whether or not potentially duplicate biometric enrollment data records exist therein. When the check 48 determines that potentially duplicate biometric enrollment data records do not exist in the BDCC system 14, the BDCC system 14 positions 50 a message in a potentially duplicate biometric enrollment data check results queue that reads "no duplicates detected," and the method continues by determining whether another program participant is to enroll 30 in the BDCC system 12. Although the message reads "no duplicates detected" in this alternative embodiment, it should be appreciated that in other embodiments, any message indicating that potentially duplicate biometric enrollment data records have not been detected may be placed in the potentially duplicate biometric enrollment data check results queue.

Otherwise, when the check 48 determines that potentially duplicate biometric enrollment data records exist in the BDCC system 14, the BDCC system 14 facilitates communicating the unique identifiers associated with the potentially duplicate biometric enrollment data records to the EPC system 12. Specifically, the BDCC system 14 positions 52 the unique identifiers associated with the potentially duplicate biometric enrollment data records, in the potentially duplicate biometric enrollment data check results queue for use by the EPC system 12. It should be appreciated that the potentially duplicate biometric enrollment data check results queue can be a database queue or a message queue maintained in the BDCC system 14.

In this alternative exemplary embodiment, the BDCC system 14 does not transmit the results included in the potentially duplicate biometric enrollment data check results queue to the EPC system 12. Rather, the EPC system 12 is configured to automatically obtain the unique identifiers associated with the potentially duplicate biometric enrollment data records from the potentially duplicate biometric enrollment data check results queue and use the obtained unique identifiers to update the enrollment data records stored in the EPC system 12.

After obtaining the unique identifiers associated with the potentially duplicate biometric enrollment data records from the potentially duplicate biometric enrollment data check results queue, the EPC system 12 associates each of the obtained unique identifiers with a corresponding enrollment data record stored therein. By virtue of associating an obtained unique identifier with a corresponding enrollment data record, the corresponding enrollment data record is identified as a potentially duplicate enrollment data record that corresponds to a potentially duplicate biometric enrollment data record. Moreover, the EPC system 12 determines 54 whether or not any of the potentially duplicate enrollment data records stored therein is a true duplicate enrollment data record. When the EPC system 12 determines 54 that potentially duplicate enrollment data records stored therein are not true duplicate enrollment data records, the method continues by determining whether another program participant is to enroll 30 in the BDCC system 14.

Otherwise, when the EPC system 12 determines 54 that potentially duplicate enrollment data records stored therein are true duplicate enrollment data records, the EPC system 12 executes an appropriate one of the existing business processes, services or tools to determine one of the true duplicate enrollment data records to retain. Moreover, the EPC system 12 executes an appropriate one of the existing business processes, services or tools to, if necessary, update information in the true duplicate enrollment data record to be retained, and then deletes the other true duplicate enrollment data records that are not to be retained. It should be appreciated that in other embodiments, any business process may be used to detect and resolve potentially duplicate enrollment data records that facilitates simplifying integration of the EPC system 12 and the BDCC system 14 as described herein. Although unique identifiers provided by the BDCC system 14 are used by the EPC system 12 to facilitate determining true duplicate enrollment data records in this alternative embodiment, it should be appreciated that in other embodiments the existing business processes, services and tools included in the EPC system 12 may utilize the unique identifiers as well as any additional data stored in the BDCC system 14 that facilitates the EPC system 12 to determine true duplicate enrollment data records. Moreover, it should be appreciated that in this alternative embodiment the EPC system 12 is able to utilize the unique identifiers and additional data from the BDCC system 14 to determine true duplicate enrollment data records stored in the EPC system 12 without being modified.

After updating the enrollment data records stored in the EPC system 12, the method continues by transmitting a delete command 56 from the EPC system 12 to the BDCC system 14. It should be appreciated that the delete command includes a list of unique identifiers associated with the true duplicate enrollment data records deleted from the EPC system 12. Moreover, the delete command contains instructions commanding the BDCC system 14 to delete the biometric enrollment data records associated with the listed unique identifiers from the BDCC system 14. In response, the BDCC system 14 deletes the biometric enrollment data records stored therein that are associated with the listed unique identifiers. It should be appreciated that by virtue of deleting biometric enrollment data records associated with the listed unique identifiers, the BDCC system 14 deletes true duplicate biometric enrollment data records from the BDCC system 14 corresponding to the true duplicate enrollment data records deleted from the EPC system 12. Thus, synchronization between the biometric enrollment data records stored in the BDCC system 14 and the enrollment data records stored in the EPC system 12 is facilitated to be enhanced.

After deleting the true biometric enrollment data records from the BDCC system 14, if another program participant is to enroll 30 in the BDCC system 14 the method continues by determining 38 whether or not the program participant is enrolled in the EPC system 12. When the program participant is not enrolled in the EPC system 12, the program participant enrolls 22 in the EPC system 12. Otherwise, the program participant enrolls 46 in the BDCC system 14. However, if another program participant is not to enroll 30, the method ends 58.

Figure 4:
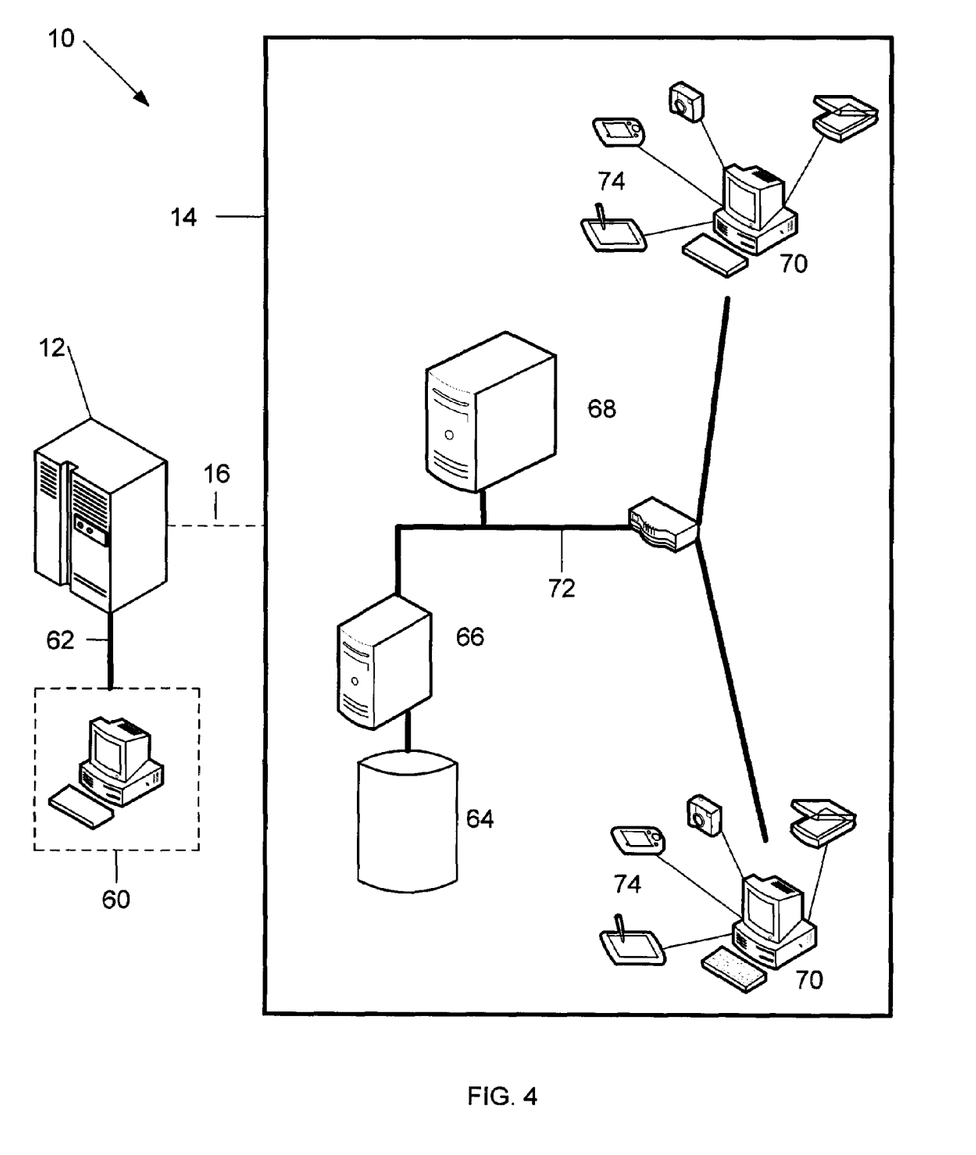
FIG. 4 is an expanded block diagram of an exemplary embodiment of a system architecture of the Retrofitted Entitlement Program Computer System shown in FIG. 1.

FIG. 4 is an expanded block diagram of an exemplary embodiment of a system architecture of the REPC System 10 shown in FIG. 1, for simplifying integration of the BDCC system 14 with the EPC system 12. More specifically, the REPC system 10 includes the EPC system 12, the BDCC system 14, and system interface 16.

In the exemplary embodiment, the EPC system 12 may include components such as, but not limited to, a database server, an application server, a directory server and a disk storage unit arranged to be combined in a single structure. The disk storage unit may store any kind of data. Although these components are combined to form a single structure in the form of the EPC system 12 in the exemplary embodiment, it should be appreciated that in other embodiments these components may be separately positioned at different locations and operatively coupled together in a network such as, but not limited to, a local area network (LAN), a wide area network (WAN), and the Internet.

The EPC system 12 is typically configured to be communicatively coupled to end users at workstations 60 using a Local Area Network (LAN) 62. However, it should be appreciated that in other embodiments, the EPC system 12 may be communicatively coupled to end users via any kind of network including, but not limited to, a Wide Area Network (WAN) and the Internet. It should be understood that any authorized end user at the workstations 60 can access the EPC system 12. Moreover, it should be understood that the EPC system 12 is configured to store therein enrollment data records of program participants.

The BDCC system 14 includes components such as, but not limited to, a disk storage device 64, a database management server 66, a biometric authentication server 68, and biometric data collection and enrollment workstations 70. The components 64, 66, 68, 70 of the BDCC system 14 communicate over a LAN 72. The disk storage device 64 is for storing at least biometric enrollment data records of program participants, and database management system 66 facilitates manipulating the biometric enrollment data records stored in the device 64 and transferring data to and from the device 64. The biometric authentication server 68 is configured to perform biometric matching to authenticate program participants, and is configured to detect potentially duplicate biometric enrollment data records. Although the BDCC system 14 and the components 64, 66, 68, 70 communicate over the LAN 72 in the exemplary embodiment, it should be appreciated that in other embodiments any kind of network may be used such as, but not limited to, a Wide Area Network and the Internet.

The EPC system 12 and the BDCC system 14 may be coupled together via the system interface 16 such that the EPC system 12 is facilitated to detect potentially duplicate enrollment data records stored in the EPC system 12. It should be understood that in the exemplary embodiment the system interface 16 is not implemented as a communications medium that is used for transmitting messages between the EPC system 12 and the BDCC system 14. Instead, the system interface 16 is manually implemented by typing the unique identifiers into a keyboard at one of the workstations 70, or at the workstations 60. Although the system interface 16 is not implemented as a communications medium in the exemplary embodiment, it should be appreciated that in other embodiments the system interface 16 may be implemented as a communications medium such as, but not limited to, a local area network (LAN), a wide area network (WAN), and the Internet. Moreover, the system interface 16 may be implemented as any combination of a LAN, a WAN and the Internet.

The enrollment workstations 70 include devices, such as, but not limited to, a CD-ROM drive for reading data from computer-readable recording mediums, such as a compact disc-read only memory (CD-ROM), a magneto-optical disc (MOD) and a digital versatile disc (DVD). Additionally, the computers included in the workstations 70 include a memory (not shown). Moreover, the workstations 70 include display devices, such as, but not limited to, liquid crystal displays (LCD), cathode ray tubes (CRT) and color monitors. Furthermore, the enrollment workstations 70 include printers and input devices such as, but not limited to, a mouse (not shown), keypad (not shown), a keyboard, a microphone (not shown), and biometric capture devices 74.

Each of the biometric capture devices 74 includes hardware configured to capture a specific type of biometric sample. In the exemplary embodiment, each biometric capture device 74 may be any device that captures any kind of desired biometric data sample that facilitates enabling the EPC system 12 to detect potentially duplicate enrolment data records stored therein. Such devices include, but are not limited to, retina scanners, fingerprint scanners, vascular scanners and digital cameras. It should be appreciated that although the exemplary embodiment includes two enrollment workstations 70, other embodiments may include any number of enrollment workstations 70 that facilitates enabling the EPC system 12 to detect potentially duplicate enrollment data records as described herein. Moreover, although the exemplary embodiment retrofits the EPC system 12 by adding enrollment workstations 70 as part of the BDCC system 14, it should be appreciated that in other embodiments any of the workstations 60 may be replaced with enrollment workstations 70.

The biometric authentication server 68 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processor executes instructions, or computer programs, stored in authentication server 68 memory (not shown). The above examples are exemplary only, and are thus not intended to limit in any way the definition and/or meaning of the term "processor."

The memory (not shown) in the application server of EPC system 12, authentication server 68 and in the computers of workstations 60 and workstations 70, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of authentication server 68, and the memory of the computers included in the workstations 70, is used to store executable instructions, or computer programs, therein. The term "computer program" is intended to encompass an executable program that exists permanently or temporarily on any computer-readable recordable medium that causes the computer or computer processor to execute the program.

In the exemplary embodiments, the above described methods of simply and quickly integrating the EPC system 12 and the BDCC system 14 via the system interface 16, facilitate simply and quickly detecting potentially duplicate enrollment data records, stored in the EPC system 12, of programs managed by the EPC system 12. More specifically, in each embodiment biometric enrollment data records stored in the BDCC system 14 are used to detect potentially duplicate biometric enrollment data records and associated unique identifiers, and the BDCC system 14 provides the unique identifiers associated with each of the detected potentially duplicate biometric enrollment data records to the EPC system 12. The EPC system 12 is configured to use the provided unique identifiers to facilitate determining whether enrollment data records stored therein are true duplicate enrollment data records, and to facilitate deleting true duplicate enrollment data records that are not to be retained. The EPC system 12 provides the unique identifiers associated with each of deleted true duplicate enrollment data records to the BDCC system 14, and the BDCC system 14 deletes biometric data enrollment records associated with each of the unique identifiers provided by the EPC system 12. Thus, by virtue of deleting biometric enrollment data records associated with each of the unique identifiers provided by the EPC system 12, the BDCC system 14 deletes true duplicate biometric enrollment data records from the BDCC system 14 corresponding to the true duplicate enrollment data records deleted from the EPC system 12

As a result, integrating existing program computer systems with biometric duplicate check computer systems is facilitated to be simplified and the time required to implement such integrations is facilitated to be reduced. Moreover, in low volume manually operated retrofitted existing program computer systems, programming changes are not required to be made to the existing program computer system. Consequently, a biometric duplicate checking feature can be added to an existing program computer system simply and quickly, within a day or two, and the business benefits of duplicate detection can begin much sooner than is otherwise possible with known integration techniques. Furthermore, in high volume automatically operated retrofitted existing program computer systems, an interface for facilitating automatic communication of duplicate unique identifiers in a potentially duplicate biometric enrollment data record check results queue, and for maintaining databases of the existing program computer system and of the biometric duplicate check computer system in synchronization could be implemented within a few days. Consequently, business benefits resulting from better detection of potentially duplicate enrollment data records begin much sooner than with known integration techniques of known identity detection systems. Accordingly, economic and efficient administration of entitlement programs, such as welfare and pension programs, managed by existing program computer systems are facilitated to be enhanced in a cost effective and reliable manner.

While the invention has been described in terms of various specific embodiments, those skilled in the art will recognize that the invention can be practiced with modification within the spirit and scope of the claims.

What is claimed is:

1. A method for integrating duplicate checks with an existing computer system including at least a processor, said method comprising:

assigning each of a plurality of participants a participant unique identifier, collecting demographic data from each of the plurality of participants, associating each of the plurality of participant unique identifiers with demographic data collected from a respective one of the plurality of participants, and storing each of the plurality of participant unique identifiers and associated demographic data in the existing computer system as enrollment data records;

capturing participant biometric data from each of the plurality of participants at a biometric duplicate check computer system that is different than the existing computer system;

enrolling each of the plurality of participants in the biometric duplicate check computer system by obtaining each of the plurality of participant unique identifiers from the existing computer system, inputting each of the plurality of participant unique identifiers into the biometric duplicate check computer system, associating each of the plurality of participant unique identifiers with participant biometric data captured from a corresponding one of the plurality of participants, and storing each of the plurality of participant unique identifiers and associated participant biometric data as a biometric enrollment data record in the biometric duplicate check computer system;

checking for potentially duplicate biometric enrollment data records stored in the biometric duplicate check computer system by comparing a new biometric enrollment data record against the biometric enrollment data records stored in the biometric duplicate check computer system, after said enrolling operation;

determining that potentially duplicate biometric enrollment data records exist when the participant biometric data included in a plurality of the biometric enrollment data records stored in the biometric duplicate check computer system match the participant biometric data included in the new biometric enrollment data record, wherein one of the plurality of matching biometric enrollment data records is the new biometric enrollment data record;

communicating the participant unique identifiers associated with the plurality of matching biometric enrollment data records from the biometric duplicate check computer system to the existing computer system;

associating each of the participant unique identifiers communicated from the biometric duplicate check computer system with a corresponding enrollment data record and identifying each of the corresponding enrollment data records as a potentially duplicate enrollment data record in the existing computer system;

determining whether any of the potentially duplicate enrollment data records is a true duplicate enrollment data record, using existing processes included in the existing computer system;

determining one of the true duplicate enrollment data records to retain in the existing computer system, updating information in the retained true duplicate enrollment data record, and deleting true duplicate enrollment data records from the existing computer system that are not to be retained in the existing computer system, using the existing processes included in the existing computer system when a plurality of the potentially duplicate enrollment data records are true duplicate enrollment data records;

communicating participant unique identifiers of the true duplicate enrollment data records deleted from the existing computer system to the biometric duplicate check computer system from the existing computer system; and deleting biometric enrollment data records from the biometric duplicate check computer system that are associated with the participant unique identifiers of the true duplicate enrollment data records deleted from the existing computer system to synchronize the biometric enrollment data records stored in the biometric duplicate check computer system with the enrollment data records stored in the existing computer system.

2. A method for integrating duplicate checks with an existing computer system in accordance with claim 1, further comprising linking the enrollment data records to the biometric enrollment data records using the participant unique identifiers such that the participant unique identifiers constitute an interface between the enrollment data records and the biometric enrollment data records.

3. A method for integrating duplicate checks with an existing computer system in accordance with claim 1, wherein said communicating operation comprises:

printing the participant unique identifiers associated with the plurality of matching biometric enrollment data records in a hardcopy report at the biometric duplicate check computer system; and providing an operator of the existing computer system with the hardcopy report such that the operator is able to input the participant unique identifiers associated with the plurality of matching enrollment data records into the existing computer system.

4. A method for integrating duplicate checks with an existing computer system in accordance with claim 3, further comprising:

printing the participant unique identifier of each of the true duplicate enrollment data records deleted from the existing computer system on a second hardcopy report;

providing the second hardcopy report to an operator of the biometric detection check computer system such that the biometric detection check computer system operator is able to input the participant unique identifier of each of the deleted true duplicate enrollment data records into the biometric duplicate check computer system; and deleting biometric enrollment data records from the biometric duplicate check computer system that are associated with the inputted participant unique identifiers.

5. A method for integrating duplicate checks with an existing computer system in accordance with claim 1, further comprising printing a message indicating that no potentially duplicate biometric enrollment data records have been detected when no greater than one biometric enrollment data record matches the participant biometric data included in the new biometric enrollment data record.

6. A method for integrating duplicate checks with an existing computer system in accordance with claim 1, wherein said communicating operation comprises:

positioning the participant unique identifiers associated with the plurality of matching biometric enrollment data records in a duplicate check results queue of the biometric duplicate check computer system; and obtaining, automatically, the participant unique identifiers associated with the plurality of matching biometric enrollment data records from the duplicate check results queue with the existing computer system.

7. A method for integrating duplicate checks with an existing computer system in accordance with claim 6, further comprising transmitting a delete command from the existing computer system to the biometric duplicate check computer system.

8. A method for integrating duplicate checks with an existing computer system in accordance with claim 1, further comprising positioning a message in a duplicate check results queue indicating that no potentially duplicate biometric enrollment data records have been detected when no greater than one biometric enrollment data record matches the participant biometric data included in the new biometric enrollment data record.

9. A system for integrating biometric duplicate checks in a program, said system comprising:

an existing computer system including at least a processor, said existing computer system configured to store enrollment data records of a plurality of participants in the program, each enrollment data record including a unique identifier and associated demographic data corresponding to a program participant; and a biometric duplicate check computer system different than said existing computer system, said biometric duplicate check computer system being configured to obtain the unique identifier of each program participant from said existing computer system, input the unique identifier of each program participant in said biometric duplicate check computer system, capture participant biometric data from each program participant, associate the unique identifier of each program participant with captured participant biometric data of the corresponding program participant, and store the unique identifiers and associated participant biometric data therein as biometric enrollment data records, compare a new biometric enrollment data record against the biometric enrollment data records stored in said biometric duplicate check computer system to check for potentially duplicate biometric enrollment data records, determine that potentially duplicate biometric enrollment data records exist when the participant biometric data included in a plurality of the biometric enrollment data records stored in said biometric duplicate check computer system matches the participant biometric data included in the new biometric enrollment data record, wherein one of the plurality of matching biometric enrollment data records is the new biometric enrollment data record, position participant unique identifiers associated with the plurality of matching biometric enrollment data records in a duplicate check results queue, wherein said existing computer system is configured to
  automatically obtain the participant unique identifiers from the duplicate check results queue, associate each of the obtained participant unique identifiers with a corresponding enrollment data record in said existing computer system and identify each of the corresponding enrollment data records as a potentially duplicate enrollment data record in said existing computer system, determine whether any of the potentially duplicate enrollment data records is a true duplicate enrollment data record, determine one of the true duplicate enrollment data records to retain in said existing computer system, update information in the retained true duplicate enrollment data record, and delete true duplicate enrollment data records from said existing computer system that are not to be retained in said existing computer system, using existing processes included in said existing computer system when a plurality of the potentially duplicate enrollment data records are true enrollment data records, transmit the unique identifiers of the true duplicate enrollment data records deleted from said existing computer system to said biometric duplicate check computer system, and said biometric duplicate check computer system is further configured to delete biometric enrollment data records stored therein that are associated with the unique identifiers of the true duplicate enrollment data records deleted from the existing computer system to synchronize the biometric enrollment data records stored in said biometric duplicate check computer system with the enrollment data records stored in said existing computer system.

10. A system for integrating biometric duplicate checks into a program in accordance with claim 9, wherein said biometric duplicate check system comprises at least one biometric capture device configured to capture biometric data of a desired biometric feature.

11. A system for integrating biometric duplicate checks into a program in accordance with claim 10, wherein the desired biometric feature is a fingerprint.

12. A system for integrating biometric duplicate checks into a program in accordance with claim 9, wherein the existing processes enable said existing computer system to at least determine true duplicate enrollment data records in said existing computer system, delete enrollment data records from said existing computer system, merge enrollment data records in said existing computer system, add enrollment data records to said existing computer system, and update enrollment data records in said existing computer system.

13. A method of synchronizing identity enrollment data records stored in an identity duplicate check computer system with enrollment data records stored in an existing computer system that includes at least a processor, wherein the identity duplicate check computer system is different than the existing computer system, said method comprising:

inputting a participant unique identifier associated with a participant enrolling in the identity duplicate check computer system;

capturing participant identity data from the enrolling participant;

associating the participant unique identifier with the participant identity data;

storing the participant unique identifier and participant identity data in the identity duplicate check computer system as a new one of a plurality of identity enrollment data records;

comparing the new identity enrollment data record against identity enrollment data records stored in the identity duplicate check computer system to check for potentially duplicate identity enrollment data records, after said storing operation;

determining that potentially duplicate identity enrollment data records exist when the participant identity data included in a plurality of the identity enrollment data records stored in the identity duplicate check computer system matches the participant identity data included in the new identity enrollment data record, wherein one of the plurality of the identity enrollment data records is the new identity enrollment data record;

positioning participant unique identifiers associated with the plurality of the identity enrollment data records in a duplicate check results queue;

obtaining, automatically, the participant unique identifiers associated with the plurality of the identity enrollment data records from the duplicate check results queue with the existing computer system, associating each of the automatically obtained participant unique identifiers with a corresponding enrollment data record in the existing computer system, and identifying each of the corresponding enrollment data records as a potentially duplicate enrollment data record in the existing computer system;

determining whether any of the potentially duplicate enrollment data records is a true duplicate enrollment data record;

determining one of the true duplicate enrollment data records to retain in the existing computer system, updating information in the retained true duplicate enrollment data record, and deleting true duplicate enrollment data records from the existing computer system that are not to be retained in the existing computer system, using existing processes included in the existing computer system when a plurality of the potentially duplicate enrollment data records are true duplicate enrollment data records;

transmitting a delete command, including the participant unique identifiers of the true duplicate enrollment data records deleted from the existing computer system, from the existing computer system to the identity duplicate check computer system; and deleting identity enrollment data records stored in the identity duplicate check computer system that are associated with the participant unique identifiers of the true duplicate enrollment data records deleted from the existing computer system to synchronize the identity enrollment data records stored in the identity duplicate check computer system with the enrollment data records stored in the existing computer system.

14. A method of synchronizing identity enrollment data records stored in an identity duplicate check computer system with enrollment data records stored in an existing computer system in accordance with claim 13, wherein said capturing operation comprises capturing identity data of the enrolling participant that corresponds to a desired biometric feature.

15. A method of synchronizing identity enrollment data records stored in an identity duplicate check computer system with enrollment data records stored in an existing computer system in accordance with claim 14, wherein said capturing operation further comprises capturing fingerprint biometric data as the identity data of the enrolling participant.

16. A method of synchronizing identity enrollment data records stored in an identity duplicate check computer system with enrollment data records stored in an existing computer system in accordance with claim 13, wherein the existing processes included in the existing computer system facilitate at least merging enrollment data records in the existing computer system and adding enrollment data records to the existing computer system.

17. A method of synchronizing identity enrollment data records stored in an identity duplicate check computer system with enrollment data records stored in an existing computer system in accordance with claim 13, wherein the new identity enrollment data record is a biometric enrollment data record of a new enrollee in a program managed by the existing computer system.

* * * * *